(12) United States Patent
Michiki et al.

(10) Patent No.: US 6,428,760 B1
(45) Date of Patent: Aug. 6, 2002

(54) METHOD FOR DESULFURIZING EXHAUST GAS

(75) Inventors: Hideyuki Michiki; Hisashi Miyakawa, both of Chiba; Mitsuo Okada, Tokyo; Tetsu Shimatani, Chiba; Fumio Hori, Osaka, all of (JP)

(73) Assignee: Toyo Engineering Corporation, Tokyo (JP)

( * ) Notice: Subject to any disclaimer, the term of this patent is extended or adjusted under 35 U.S.C. 154(b) by 0 days.

(21) Appl. No.: 09/598,073

(22) Filed: Jun. 20, 2000

(30) Foreign Application Priority Data

Jun. 22, 1999 (JP) .......................................... 11-175752
Jun. 23, 1999 (JP) .......................................... 11-177112

(51) Int. Cl.⁷ .............................................. B01D 53/50
(52) U.S. Cl. ................. 423/243.08; 423/164; 423/166; 423/243.11; 423/243.12; 423/555; 423/635; 423/636; 423/638
(58) Field of Search ................. 423/243.08, 243.11, 423/243.12, 164, 166, 555, 635, 636, 638

(56) References Cited

U.S. PATENT DOCUMENTS

| | | | | |
|---|---|---|---|---|
| 4,193,971 A | * | 3/1980 | Kawamata et al. | ......... 423/242 |
| 4,294,807 A | * | 10/1981 | Randolph | .................... 423/242 |
| 5,039,499 A | * | 8/1991 | Stowe, Jr. | .................... 423/242 |
| 5,270,026 A | * | 12/1993 | College et al. | ........ 423/243.08 |
| 5,676,915 A | * | 10/1997 | Iiyama | .................. 423/243.01 |

FOREIGN PATENT DOCUMENTS

DE          27 55 252 A1 * 7/1979 ............ 423/243.08

* cited by examiner

*Primary Examiner*—Steven P. Griffin
*Assistant Examiner*—Timothy C. Vanoy
(74) *Attorney, Agent, or Firm*—Knobbe, Martens, Olson and Bear, LLP

(57) ABSTRACT

The present invention relates to the improvement of a replenishment method of a magnesium-based compound and to the improvement of a double decomposition method, which can be used in a magnesium hydroxide desulfurization method. In the improved replenishment method, the magnesium-based compound is supplemented with water and the ratio of $Mg/H_2O$ is adjusted to the total $Mg/H_2O$ in the desulfurization system. In the improved double decomposition method, a tank for use is provided with an inner cylinder which partitions the tank into an inner part and an outer part, but does not reach the bottom of the tank, and a part of the slurry drawn through the bottom of the tank is fed to the outer upper position in the tank.

6 Claims, 7 Drawing Sheets

METHOD FOR DESULFURIZING EXHAUST GAS

BACKGROUND OF THE INVENTION (1) Field of the Invention

The present invention relates to the improvement of a replenishment method of a magnesium-based compound which can be used in a magnesium hydroxide desulfurization method for fixing and removing sulfur oxides contained in an exhaust gas by the use of the magnesium-based compound as a desulfurizing agent; and the improvement of a double decomposition method for fixing the sulfur oxides by the use of the magnesium-based compound and then double-decomposing, with a basic calcium compound, a solution of a desulfurizing step which has passed through an oxidizing step to form magnesium hydroxide and gypsum dihydrate (hereinafter refrred to as "gypsum").

(2) Description of the Prior Art

A magnesium hydroxide desulfurization method is well known which comprises a desulfurizing step of removing sulfur oxides from an exhaust gas by bringing a magnesium-based compound (such as magnesium hydroxide, magnesium oxide, magnesium carbonate, or magnesium hydroxide obtained using dolomite and the like as raw materials) into gas-liquid contact with the exhaust gas, an oxidizing step of converting magnesium sulfite and the like contained in the solution of the desulfurizing step to magnesium sulfate by oxidizing the solution, and a double decomposition step of subjecting magnesium sulfate to a double decomposition reaction with a basic calcium compound to produce magnesium hydroxide and gypsum. Furthermore, in the known method, (1) magnesium hydroxide and gypsum obtained in the double decomposition step are sent to the desulfurizing step directly or via a storage step in which magnesium hydroxide and gypsum are temporarily stored, and contained magnesium hydroxide is used as a desulfurizing agent again and gypsum is recovered from the desulfurizing step or the oxidizing step; or (2) a slurry of magnesium hydroxide and gypsum obtained in the double decomposition step is separated into a slurry having a higher magnesium hydroxide concentration and a slurry having a higher gypsum concentration, and the former is sent to the desulfurizing step in which contained magnesium hydroxide is used as the desulfurizing agent again, while the latter is sent to a gypsum separation step in which gypsum is separated and collected.

In this magnesium hydroxide desulfurization method, magnesium hydroxide which is used as the desulfurizing agent is circulated in the system while its form changes into magnesium sulfite, magnesium sulfate, and magnesium hydroxide again. However, in order to prevent the accumulation of dust, chlorine compounds and the like in the exhaust gas, a part of the solution is required to be discharged as a blow water, so that a part of the magnesium compound which circulates in the system is discharged with this blow water, which means the loss of the magnesium compound.

Heretofore, in order to replenish the system with magnesium hydroxide for lost magnesium, 30 to 35% by weight of a magnesium hydroxide slurry is fed to a recovery magnesium hydroxide tank via a line L1, as shown in FIG. 3.

On the other hand, the magnesium compound contained in the blow water discharged from the system varies in concentration at positions where it is drawn. However, even if the blow water is drawn at any position, a magnesium compound concentration in the blow water is much lower as compared with a concentration of magnesium hydroxide to be replenished. Therefore, during the operation for a long time, a balance between magnesium and water in the system changes, which fact makes the continuous operation impossible. To avoid such an inconvenience, a recovery magnesium hydroxide tank is provided as a kind of buffer tank, but even in this case, a water level in the recovered magnesium hydroxide tank changes very noticeably, and so it is difficult to accomplish the stable operation.

The double decomposition step which is one step of the magnesium hydroxide desulfurization method has been conventionally carried out by a device shown in FIG. 7. This device comprises a double decomposition tank 4 and a basic calcium slurry tank 5.

The double decomposition tank 4 comprises an inner cylinder 6 which partitions the tank into an inner part and an outer part and which does not reach the bottom of the double decomposition tank, a means for circularly feeding, to an upper position of the double decomposition tank 4, a part of a double-decomposed slurry (hereinafter referred to as "circulating fluid") drawn through the bottom of the tank 4, and a discharge nozzle 7 for overflow disposed at an upper side of the outer part of tank 4.

The slurry of the inner part of the inner cylinder 6 of the double decomposition tank is stirred by a stirrer to promote the growth of gypsum crystals. On the other hand, owing to the structure of the inner cylinder, the slurry of the outer portion of the inner cylinder is not influenced by the stirring.

A slurry containing magnesium hydroxide as a main component is drawn through the discharge nozzle 7 for overflow disposed at the upper part of the double decomposition tank, and a slurry containing gypsum as a main component is drawn through the bottom of the tank.

In the basic calcium slurry tank (hereinafter referred to as "the slurry tank" sometimes), a basic calcium compound and water or a separated fluid of a gypsum dehydrator or the like are used to prepare a slurry, and this slurry is then fed to the double decomposition tank. At this time, the slurry is fed to the inner part in the double decomposition tank.

Thus, in preparing the basic calcium slurry by the conventional double decomposition method, the basic calcium compound and water are added to the slurry tank to prepare a slurry having a predetermined concentration, and the thus prepared slurry is fed to the double decomposition tank. Consequently, water used for the preparation is required to be discharged as the blow water. In this case, depending on a position where the blow water is discharged, the magnesium compound is discharged in the form of magnesium sulfate or magnesium hydroxide together with the blow water, which means the loss of the magnesium compound.

Further, in the conventional method in which the circulating fluid is fed to the inner part of the double decomposition tank, the magnesium hydroxide slurry produced by the double decomposition reaction is discharged through the discharge nozzle for overflow with an upward flow via the outer part of the double decomposition tank. The magnesium hydroxide slurry is not steadily but intermittently discharged like breathing by this overflow. Therefore, there is observed a phenomenon that properties of the slurry drawn through the double decomposition tank, for example, a content of magnesium hydroxide and a ratio between magnesium hydroxide and gypsum change.

SUMMARY OF THE INVENTION

An object of the present invention is to provide a replenishment method of a magnesium-based compound for constantly maintaining a magnesium/water balance which is the problem of the above-mentioned conventional technique. Another object of the present invention is to provide a method for solving the problem of the above-mentioned double decomposition step.

The first aspect of the present invention is directed to a replenishment method of an absorbent in a desulfurization method of an exhaust gas which comprises the step of feeding magnesium hydroxide to make compensation for a magnesium-based compound which is incorporated in a blow water and then discharged from the system, while a ratio of supplementary magnesium hydroxide to be fed is adjusted to a molar ratio of total magnesium/water in the system.

The second aspect of the present invention is directed to a double decomposition method which comprises the step of using a double decomposition tank having an inner cylinder which partitions the double decomposition tank into an inner part and an outer part and which does not reach the bottom of the double decomposition tank, a discharge nozzle provided at a peripheral upper position of the double decomposition tank, and a means for circulating a part of a slurry drawn through the bottom of the tank to an upper position of the tank, whereby the part of the slurry drawn through the bottom of the double decomposition tank is fed to an upper outer part in the double decomposition tank.

The third aspect of the present invention is directed to a double decomposition method which comprises the step of using the double decomposition tank, whereby a part of the slurry of the double decomposition tank is drawn through the discharge nozzle or another discharge nozzle disposed at a position lower than the discharge nozzle, and then fed to a basic calcium slurry tank for preparing a basic calcium compound to be fed to the double decomposition tank, and the basic calcium compound is mixed with the part of the slurry of the double decomposition tank to prepare a slurry of the basic calcium compound.

According to the replenishment method of magnesium hydroxide, a water balance in the system is maintained within a predetermined range. Furthermore, according to the double decomposition method, the properties of the magnesium hydroxide slurry discharged from the double decomposition tank can be made homogeneous, and the water balance in the system can be maintained, which contributes to the stable operation of a desulfurization method with magnesium hydroxide.

DETAILED DESCRIPTION OF THE INVENTION

In a desulfurization method with magnesium hydroxide, the present invention relating to a replenishment method of a magnesium-based compound which is incorporated in a blow water and then discharged from a system is characterized by feeding a magnesium-based compound (magnesium hydroxide) to the system while a ratio of the magnesium-based compound is adjusted to a molar ratio between total magnesium and water in the system.

A position in the system at which the compound for the replenishment is fed depends on the desulfurization system. Namely, in the desulfurization method in which magnesium hydroxide and gypsum obtained in the double decomposition step are directly sent to a desulfurizing step and/or an oxidizing step, the magnesium-based compound for the replenishment is fed to the desulfurizing step and/or the oxidizing step. In the desulfurization method in which magnesium hydroxide and gypsum obtained in the double decomposition step are sent to the desulfurizing step and/or the oxidizing step via a storage step where those compounds are temporarily stored, the magnesium-based compound for the replenishment is fed to the desulfurizing step and/or the oxidizing step and/or the storage step.

The storage step comprises a storage tank which functions as a buffer of a recycling liquid containing a magnesium-based compound in the system. It is preferred that (1) in the case that a liquid surface in the storage tank is higher than a predetermined level, the desulfurizing step and/or the oxidizing step is supplied with a slurry containing magnesium hydroxide from the storage step, and at a time when the liquid surface is lower than the predetermined level, the desulfurizing step and/or the oxidizing step is replenished with the magnesium-based compound for replenishment; and (2) in the case that the liquid surface in the tank is lower than the predetermined level, the desulfurizing step and/or the oxidizing step is immediately replenished with the magnesium-based compound for replenishment.

The present invention will be described in detail with reference to the drawings.

Figure 1:
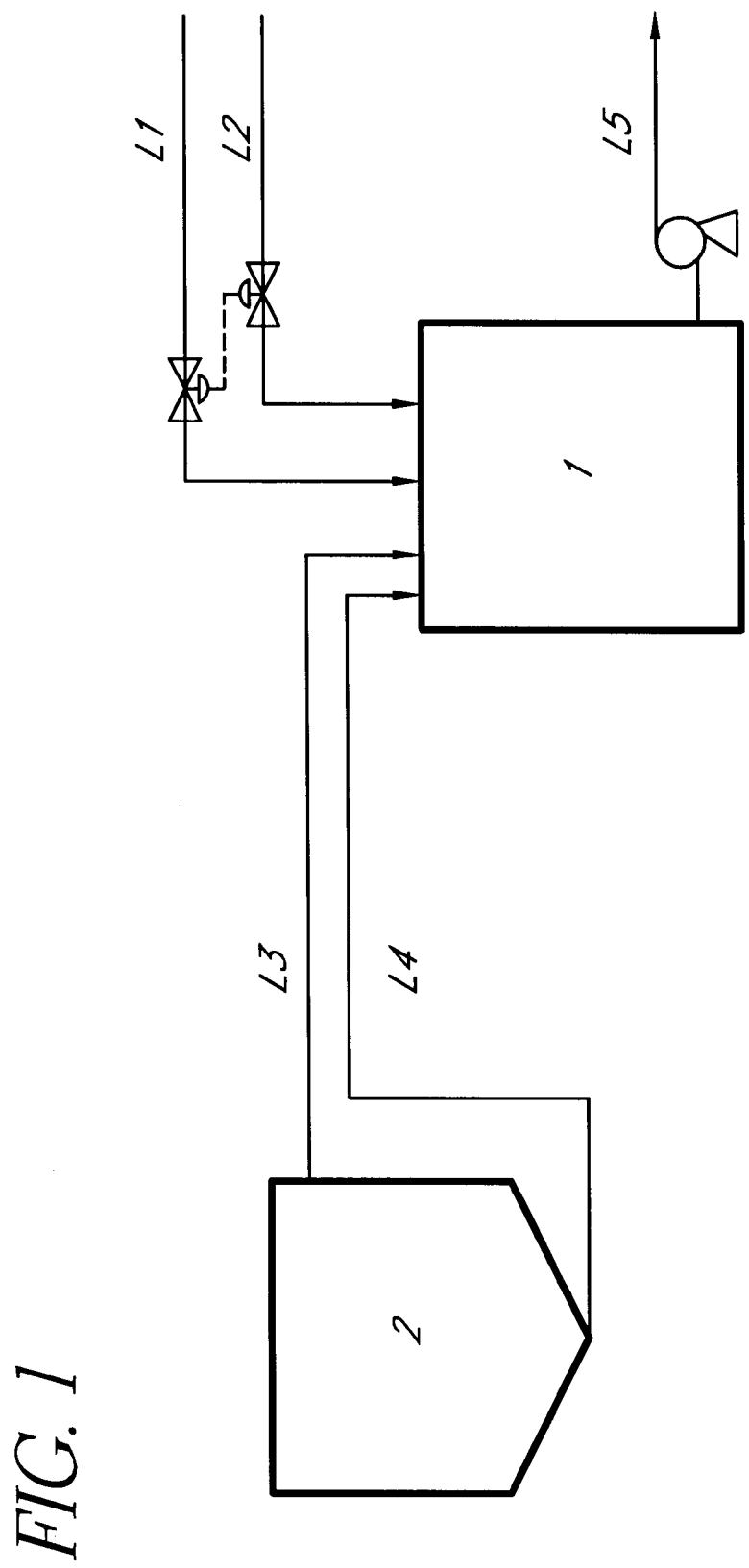
FIG. 1 shows an example of a method of replenishing a recovery magnesium hydroxide tank with a magnesium hydroxide slurry and water according to the present invention.

FIG. 1 shows, among techniques of feeding a magnesium-based compound as an absorbent according to the present invention, a step of feeding magnesium hydroxide (slurry) for the replenishment to a storage step (a recovery magnesium hydroxide tank 1) where a mixed slurry of magnesium hydroxide and gypsum formed in a double decomposition tank 2 for performing a double decomposition reaction is temporarily stored.

It is to be noted that in the drawing, the oxidizing step and a recovery step of gypsum are omitted.

In FIG. 1, the recovery magnesium hydroxide tank 1 is a tank for storing a mixed slurry of magnesium hydroxide and gypsum drawn from the double decomposition tank 2 through a line L3 (a slurry containing mainly magnesium hydroxide) and through a line L4 (a slurry containing mainly gypsum), and this tank functions as a buffer of a recycling liquid containing the magnesium-based compound in the system. The mixed slurry is sent from the recovery magnesium hydroxide tank 1 to a desulfurizing tower and/or an oxidizing tank (not shown) via a pump and a line L5, and contained magnesium hydroxide is used as a desulfurizing agent or a neutralizing agent.

During the operation for a long time, impurities such as dust or chlorine compounds contained in a gas to be desulfurized are accumulated in the system, and hence, it is necessary to discharge the accumulated impurities as the blow water from the system. Since the magnesium-based compound is also discharged with the blow water through a position through which the blow water is drawn, it is necessary to feed the magnesium-based compound. Magnesium hydroxide is fed in an amount corresponding to the amount of magnesium incorporated in the blow water and discharged from the system. Magnesium hydroxide for the replenishment is fed as a slurry of 30 to 35% by weight to the magnesium hydroxide tank 1 usually via a line L1. Since the concentration of magnesium contained in the blow water is extremely low as compared with the concentration of magnesium in the magnesium hydroxide slurry for the replenishment, water in the system decreases in such a situation, so that a molar balance of magnesium/water cannot be maintained any more. In order to maintain this balance, water is fed, in an amount sufficient to constantly maintain the molar balance of magnesium/water in the system corresponding to the blow water, to the system through a line L2 simultaneously with the feed of the magnesium hydroxide slurry for the replenishment. The amount of water to be fed can be calculated in consideration of the amount of the blow water discharged from the system, the amount of the calcium hydroxide slurry to be fed, the amount of the magnesium hydroxide slurry to be fed, and the like. When the system is in a steady state, water should be fed in an amount proportional to the amount of magnesium hydroxide for the replenishment.

Figure 2:
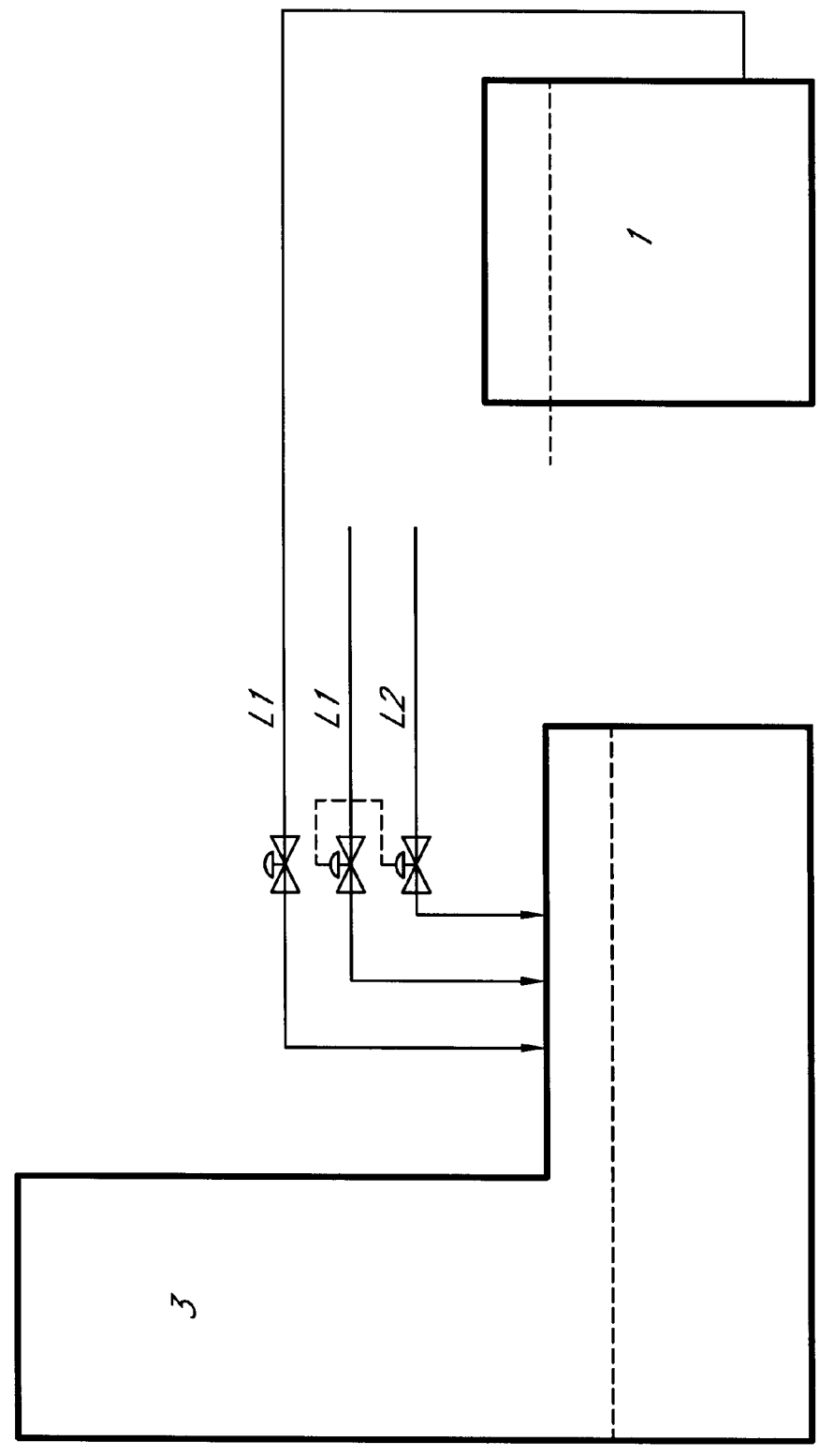
FIG. 2 shows an example of a method of replenishing a desulfurizing tower with a magnesium hydroxide slurry and water according to the present invention.

FIG. 2 shows an example of replenishing a desulfurizing step (a desulfurizing tower 3) with magnesium hydroxide (a slurry). Since a feeding means and amounts are the same as in the example of FIG. 1, their explanation is omitted. In FIG. 2, there are also omitted the double decomposition tank 2 as well as lines L3 and L4 in FIG. 1 extending to the recovery magnesium hydroxide tank 1.

The recovery magnesium hydroxide tank 1 in FIG. 2 is equipped with a level meter. In the case that the liquid level is lower than a predetermined level, the desulfurizing tower 3 and/or an oxidizing tank (not shown) is replenished with the magnesium hydroxide slurry through a line L1. In the case that the liquid level in the recovery magnesium hydroxide tank 1 is higher than the predetermined level, the replenishment of the desulfurizing tower 3 and/or the oxidizing tank is temporarily stopped, and a mixed slurry from the recovery magnesium hydroxide tank 1 through a line L6 is only fed. Thereafter, at a time when the liquid level in the recovery magnesium hydroxide tank 1 becomes lower than the predetermined level, the replenishment of the magnesium hydroxide slurry through the line L1 is started again. This operation is repeated in accordance with the position of the liquid level in the recovery magnesium hydroxide tank 1. This operation can be automatically conducted by the use of a computer.

Furthermore, in the method in FIG. 2, a water replenishment line is usually disposed in order to control the liquid level in the desulfurizing tower 3. In this case, the water replenishment line may be separately installed, but the line L2 may be also used as the water-supplying line.

The aspects of the present invention containing a double decomposition step are as follows.

1. A double decomposition method wherein a double decomposition step comprises a double decomposition tank where a double decomposition reaction is carried out to react an aqueous solution containing magnesium sulfate with a basic calcium compound and to thereby form magnesium hydroxide and gypsum, and a basic calcium slurry tank where water is added to the basic calcium compound to prepare a slurry of the basic calcium compound; and in the double decomposition device, there is used a double decomposition tank having an inner cylinder which partitions the double decomposition tank into an inner part and an outer part but which does not reach the bottom of the double decomposition tank, a discharge nozzle provided at a peripheral upper position of the double decomposition tank, and a means for circulating a part of a slurry drawn through the bottom of the tank to an upper position of the tank, whereby the part of the slurry drawn through the bottom of the double decomposition tank is fed to an upper outer part in the double decomposition tank.

2. The double decomposition method wherein the double decomposition tank described in the above-mentioned paragraph 1 is used, and a part of the slurry is drawn through the discharge nozzle or another discharge nozzle disposed at a position lower than the discharge nozzle, and then fed to the basic calcium slurry tank, where the basic calcium compound is mixed with the part of the slurry of the double decomposition tank to prepare a slurry of the basic calcium compound.

3. The double decomposition method described in the above-mentioned paragraph 2 wherein the part of the slurry drawn through the bottom of the double decomposition tank is fed to an upper outer part in the double decomposition tank.

Next, the present invention will be described in detail with reference to the drawings.

Figure 5:
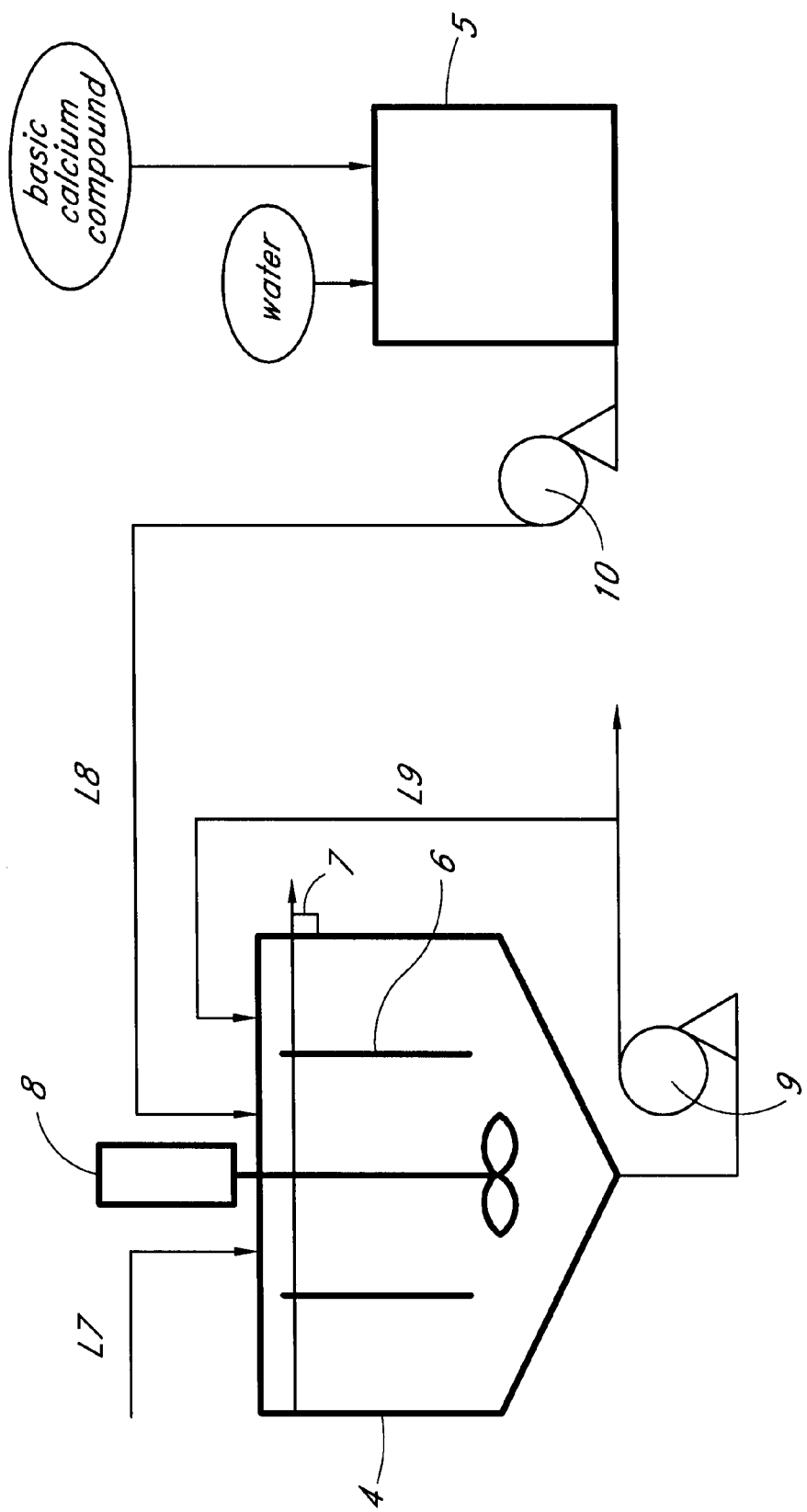
FIG. 5 shows one example of a double decomposition method according to the present invention.

FIG. 5 shows one example of a double decomposition device for carrying out a double decomposition method according to the present invention. The double decomposition devide is constituted of a double decomposition tank 4 and a slurry tank 5, and the double decomposition tank 4 is equipped with an inner cylinder 6 which partitions the tank into an outer part and an inner part, but which does not reach the bottom of the tank.

In the double decomposition tank 4, an aqueous solution containing magnesium sulfate as a main component which is sent via a line L7 from an oxidizing tank or a desulfurizing tower which constitutes a desulfurization system is reacted with a calcium hydroxide slurry to convert them into magnesium hydroxide and gypsum.

In the slurry tank 5, a basic calcium compound is mixed with water to prepare a calcium hydroxide slurry. As the basic calcium compound, slaked lime (calcium hydroxide), calcium oxide or the like, or a mixture thereof is used.

The double decomposition tank is equipped with a pump system 9 which feeds through a line L9, to the upper part in the double decomposition tank as a circulating liquid, a part of the slurry drawn from the bottom of the double decomposition tank 4, and another pump system 10 which feeds the slurry from the slurry tank 5 to the double decomposition tank 4 through a line L8. A stirring means 8 is disposed in the inner cylinder 6 in the double decomposition tank 4, but a certain kind of inner cylinder may be constituted so as to prevent the influence of the stirring from exerting on the outer part of the tank.

To the double decomposition tank 4, there are fed an aqueous solution containing magnesium sulfate as a main component from the oxidizing tank or the desulfurizing tower not shown, and a calcium hydroxide slurry from the slurry tank 5. Thus, magnesium sulfate is converted into gypsum and magnesium hydroxide owing to a double decomposition reaction under the stirring, as shown by the following chemical formula:

$$MgSO_4+Ca(OH)_2+2H_2O=Mg(OH)_2+CaSO_4 \cdot 2H_2O$$

Since the crystals of magnesium hydroxide produced by the above reaction are extremely fine as compared with the crystals of gypsum, the crystals of magnesium hydroxide rid on an upstream flow in the double decomposition tank and flows out through an overflow discharge nozzle 7, while the crystals of gypsum precipitate on a lower part of the double decomposition tank.

A slurry which is rich in fine magnesium hydroxide is drawn from the overflow discharge nozzle 7 at an upper part of the double decomposition tank, and a slurry which is rich in gypsum is drawn from the bottom of the double decomposition tank. A part of the slurry drawn from the bottom is fed, as a circulating liquid, to an upper part of the double decomposition tank.

The magnesium hydroxide slurry carried with the upstream flow which rises in the outer part in the inner cylinder and drawn from the overflow discharge nozzle 7 at a top surface of the double decomposition tank rides on the upstream flow and rises up to the upper surface of the double decomposition tank, but the magnesium hydroxide slurry which has risen up along the outer wall surface of the inner cylinder sometimes precipitates along the wall surface of the double decomposition tank. For preventing this phenomenon and accelerating the discharge of magnesium hydroxide, an elevating speed of the liquid to be discharged may be increased, or the liquid may be mixed by stirring in the vicinity of the liquid surface in the top portion. In the present invention, however, as shown in FIG. 5, the circulating liquid is fed to the surface of the outer part partitioned by the inner cylinder, whereby turbulence can be caused on the liquid surface to prevent the precipitation of magnesium hydroxide particles from precipitating. The crystals of gypsum in the mixed slurry fed under the circulation are large, so that they precipitate downward. In this regard, the number of the inlet for feeding the circulating liquid to the liquid surface in the double decomposition tank may be one or more.

Figure 6:
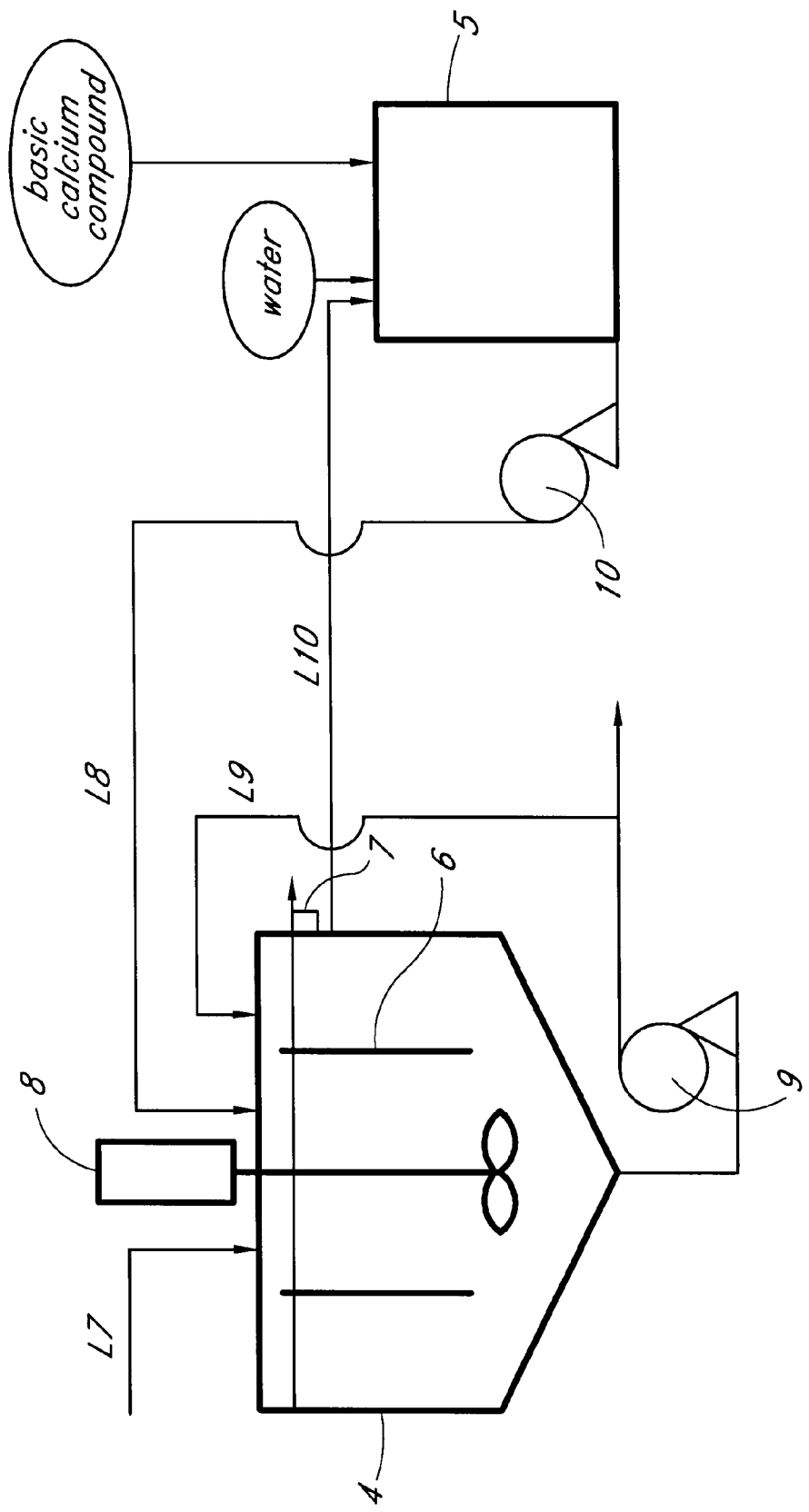
FIG. 6 shows another example of the double decomposition method according to the present invention.

FIG. 6 shows another example of the double decomposition device for carrying out the double decomposition method according to the present invention. The example of FIG. 6 is different from that of FIG. 5 in that a slurry liquid containing magnesium hydroxide drawn from the upper part of the double decomposition tank through a line L10 is used for the preparation of a calcium hydroxide slurry. The other reference numerals in FIG. 6 are the same as in FIG. 5. The slurry liquid in the double decomposition tank may be drawn through the overflow discharge nozzle 7, but it can be drawn continuously or intermittently through another discharge nozzle disposed at a slightly lower position than the overflow discharge nozzle, as shown as the line L10 in the drawing. In the case of the intermittent drawing, it is desirable to intermittently feed the basic calcium compound in association with the operation of the drawing in order to make the slurry concentration constant.

For the preparation of the calcium hydroxide slurry, the liquid alone drawn from the double decomposition tank 4 may be fed to the slurry tank 5 in consideration of a water balance.

According to the double decomposition device shown in FIG. 5, with regard to water to be fed to the slurry tank 5, it is necessary to discharge, through any position of the desulfurization system, water in an amount obtained by subtracting the amount of water used for the formation of gypsum from the amount of fed water. In the method shown in FIG. 6, however, such an operation is not required any more, and the whole system can be closed.

EXAMPLES

Examples 1 and 2 as well as Comparative Example 1 are each concerned with a replenishment method of a magnesium-based compound, and Examples 3 and 4 as well as Comparative Example 2 are each concerned with a double decomposition method.

Example 1

Example 1 was carried out using a device shown in FIG. 1.

A slurry containing 1.5% by weight of magnesium hydroxide was fed to a recovery magnesium hydroxide tank 1 through a line L3 at 87 kg/hr, and a mixed slurry containing 1.5% by weight of magnesium hydroxide and 30% by weight of gypsum was drawn through a line L4 at 15 kg/hr and then fed to the recovery magnesium hydroxide tank 1. Magnesium hydroxide for replenishment having a concentration of 30% by weight was fed to the recovery magnesium hydroxide tank 1 through a line L1 at 0.2 kg/hr and simultaneously water was fed to the recovery magnesium hydroxide tank through a line L2 at 3.8 kg/hr. A slurry containing 1.5% by weight of magnesium hydroxide and 4.3% by weight of gypsum was sent to a desulfurizing tower and an oxidizing tower through a line L5 at 106 kg/hr.

Figure 4:
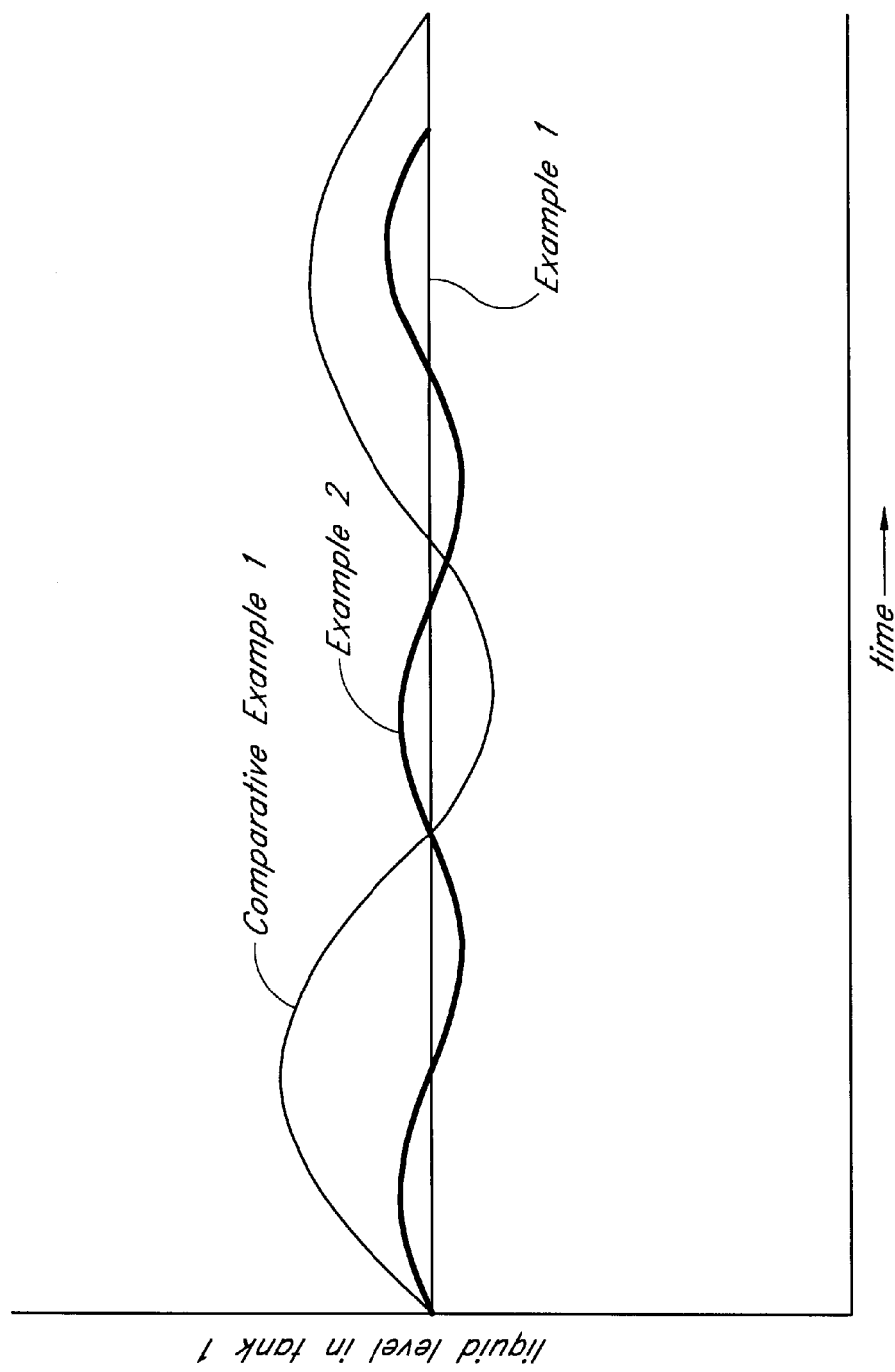
FIG. 4 shows the change of a liquid surface level in the recovery magnesium hydroxide tank.

A molar ratio of magnesium/water in the total of the magnesium hydroxide slurry and water fed through the lines L1 and L2 was set so as to be equal to a molar ratio between magnesium and water blown from a gypsum removing step. During the operation for a long time, the water level in the recovery magnesium hydroxide tank was stable as shown in FIG. 4.

Example 2

Example 2 was carried out using a device shown in FIG. 2.

A mixed slurry containing 1.5% by weight of magnesium hydroxide and 4.5% by weight of gypsum was fed to a desulfurizing tower 3 through a line L6 at 102 kg/hr. Magnesium hydroxide for replenishment having a concentration of 30% by weight was fed to the desulfurizing tower 3 through a line L1 at 0.2 kg/hr and simultaneously water was fed to the desulfurizing tower 3 through a line L2 at 3.8 kg/hr. A molar ratio magnesium/water in the total of the magnesium hydroxide slurry and water fed through the lines L1 and L2 was set so as to be equal to a molar ratio between magnesium and water blown from a gypsum removing step. During the operation for a long time, the water level in the recovery magnesium hydroxide tank 1 slightly changed as shown in FIG. 4.

Comparative Example 1

Figure 3:
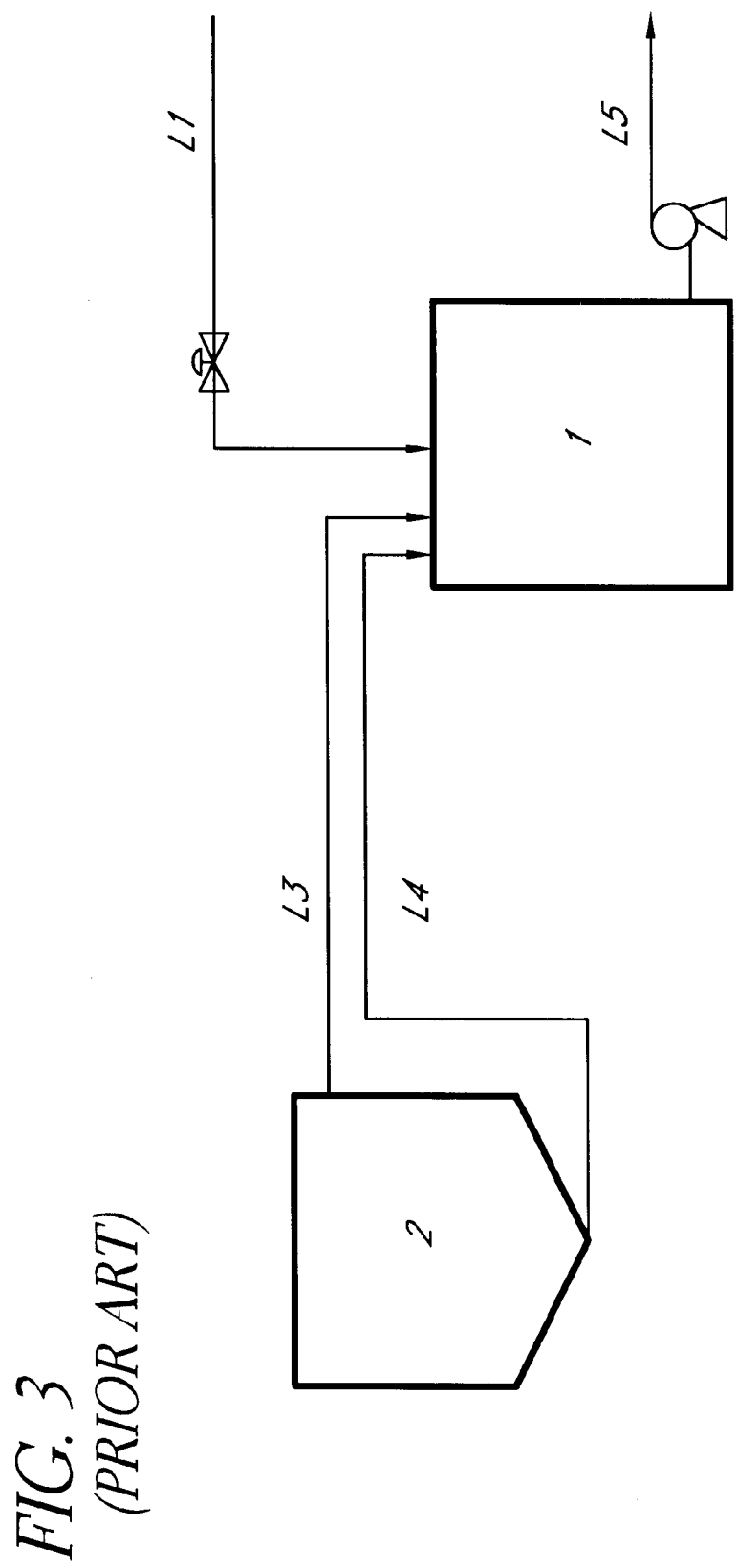
FIG. 3 shows a conventional replenishment method of a magnesium hydroxide slurry.

Comparative Example 1 was carried out using a device shown in FIG. 3.

A slurry containing 1.5% by weight of magnesium hydroxide was fed to a recovery magnesium hydroxide tank 1 from a double decomposition tank 2 through a line L3 at 87 kg/hr, and a mixed slurry containing 1.5% by weight of magnesium hydroxide and 30% by weight of gypsum was drawn through a line L4 at 15 kg/hr and then fed to the recovery magnesium hydroxide tank 1. The position of the liquid surface in the recovery magnesium hydroxide tank 1 was low, and magnesium hydroxide for replenishment having a concentration of 30% by weight was temporally fed to the recovery magnesium hydroxide tank 1 through a line L1 at 2.0 kg/hr. A slurry containing 2.0% by weight of magnesium hydroxide and 4.3% by weight of gypsum was sent to a desulfurizing tower through a line L5 at 78 kg/hr. As a result, the balance of a flow rate was lost, so that the liquid surface in the recovery magnesium hydroxide tank 1 rapidly rose. The liquid surface exceeded a predetermined position, and at this time, the replenishment of magnesium hydroxide was stopped, but the liquid surface in the recovery magnesium hydroxide tank 1 rose and afterward, it began to lower. This phenomenon was repeated.

During the operation for a long time, the water level in the recovery magnesium hydroxide tank 1 largely changed as shown in FIG. 4.

Example 3

Example 3 was carried out using a device shown in FIG. 5.

An aqueous solution including 3% by weight of magnesium sulfate was fed to a 560-litter double decomposition tank 4 from an oxidizing tower (not shown) through a line L7 at 100 liters/hr, and a slurry containing 5% by weight of calcium hydroxide was fed to the same double decomposition tank 4 from a slurry tank 5 through a line L8 by a pump system 10 at 35 liters/hr. A part of a slurry including 30% by weight of gypsum and 1% by weight of magnesium hydroxide was drawn through the bottom of the double decomposition tank 4 through a line L9 at 14 liters/hr and then fed to a outer part in the double decomposition tank 4 as a circulating liquid. A reaction temperature and a pH in the double decomposition tank were 4 50° C. and 10.3, respectively.

The concentration change of the slurry containing magnesium hydroxide as a main component which was drawn by overflow was slight, and the concentration of the slurry was maintained substantially at a constant as shown in Table 1. In the table, Experimental No. denotes the number of each slurry sampled with time.

TABLE 1

|  | Experiment No. | Slurry Conc. (wt %) |
| --- | --- | --- |
| Example 3 | 1-1 | 1.0 |
|  | 1-2 | 1.1 |
|  | 1-3 | 1.1 |
|  | 1-4 | 1.0 |
|  | 1-5 | 0.9 |
| Comp. Example 2 | 2-1 | 1.0 |
|  | 2-2 | 0.7 |
|  | 2-3 | 0.5 |
|  | 2-4 | 1.5 |
|  | 2-5 | 1.2 |

Example 4

Example 4 was carried out using a device shown in FIG. 6.

An aqueous solution containing 3% by weight of magnesium sulfate was fed from an oxidizing tank not shown to a double decomposition tank 4 through a line L7 at 100 liters/hr. A slurry containing 1.5% by weight of magnesium hydroxide was fed from the double decomposition tank 4 to a basic calcium slurry tank through a line L10 at 33 liters/hr, and from the basic calcium slurry tank, a slurry containing 5% by weight of calcium hydroxide and 1.5% by weight of magnesium hydroxide was fed to the double decomposition tank 4 through a line L8 at 35 liters/hr.

A slurry containing 30% by weight of gypsum and 1.5% by weight of magnesium hydroxide was drawn through the bottom of the double decomposition tank 4 at 14 liters/hr, and then fed to an outer part in the double decomposition tank 4 through a line L9 as a circulating liquid. A reaction temperature and a pH in the double decomposition tank 4 were 50° C. and 10.3, respectively.

The amount of water which was discharged from the system decreased as much as the amount of the slurry which was fed from the double decomposition tank 4 to the basic calcium slurry tank 5.

Comparative Example 2

Figure 7:
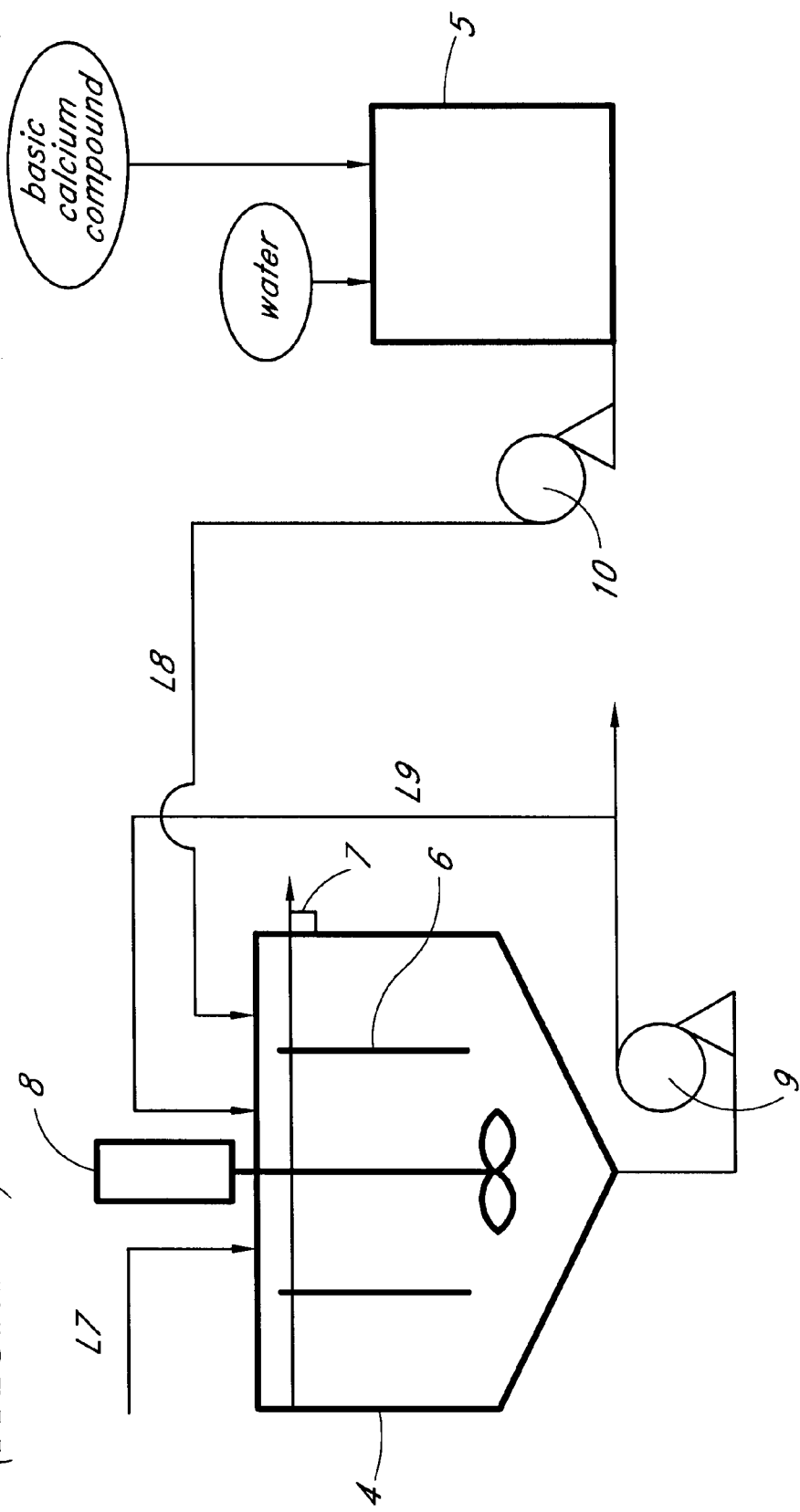
FIG. 7 shows one example of a conventional double decomposition method.

Comparative Example 2 was carried out using a device shown in FIG. 7.

An aqueous solution containing 3% by weight of magnesium sulfate was fed from an oxidizing tank (not shown) to a double decomposition tank 4 through a line L7 at 100 liters/hr, and a slurry containing 5% by weight of calcium hydroxide from a basic calcium slurry tank 5 was pumped by a pump system 10 and fed to the double decomposition tank at 35 liters/hr. A part of a slurry containing 30% by weight of gypsum and 1% by weight of magnesium hydroxide was drawn through the bottom of the double decomposition tank 4 at 14 liters/hr, and then pumped by a pump system 9 and fed to an inner part in the double decomposition tank 4 through a line L9 as a circulating liquid. A reaction temperature and a pH in the double decomposition tank 4 were 50° C. and 10.3, respectively.

The concentration of a slurry containing magnesium hydroxide as a main component which was drawn by an overflow nozzle 7 noticeably changed as shown in Table 1.

While preferred embodiments of the present invention have been described using specific terms, such description is for illustrative purposes only, and it is to be understood that changes and variations may be made without departing from the spirit or scope of the following claims.

What is claimed is:

1. A method for desulfurizing an exhaust gas in a system comprising: (i) a desulfurization tank, (ii) an oxidization tank, (iii) a double decomposition tank, and (iv) a magnesium hydroxide recovery tank, said method comprising:

(a) desulfurizing an exhaust gas in the desulfurization tank;

(b) oxidizing a liquid drawn from the desulfurization tank in an oxidation tank;

(c) subjecting a liquid drawn from the oxidization tank to double decomposition reaction;

(d) storing magnesium hydroxide and gypsum formed in the double decomposition tank in the magnesium hydroxide recovery tank;

(e) supplying a slurry from the magnesium hydroxide recovery tank to the desulfurization tank and/or the oxidization tank;

(f) discharging accumulated impurities as blow water from the system, said blow water containing magnesium;

(g) adding a magnesium compound and water at a mixing ratio to one of (I) the desulfurization tank, (II) the oxidization tank, or (III) the magnesium hydroxide recovery tank; and (h) adjusting the mixing ratio in accordance with the molar concentration of magnesium in the blow water.

2. The method according to claim 1, further comprising (i) controlling a slurry level in the magnesium hydroxide recovery tank using a level meter.

3. The method according to claim 2, further comprising:
(j) if the amount of a slurry is not more than a predetermined level, supplying a slurry drawn from the magnesium hydroxide recovery tank, and the magnesium compound and water of step (g), to the desulfurization tank and/or the oxidization tank; and
(k) if the amount of a slurry is more than the predetermined level, supplying a slurry drawn from the magnesium hydroxide recovery tank to the desulfurization tank and/or the oxidation tank and stopping the supply of the magnesium compound and water of step (g) to the desulfurization tank and/or the oxidization tank.

4. A method for performing a double decomposition reaction used in a process for desulfrizing an exhaust gas comprising: (i) desulfurizing an exhaust gas, (ii) oxidizing the desulfurized liquid, and (iii) conducting a double decomposition reaction between the oxidized liquid and a basic calcium compound to form magnesium hydroxide and gypsum, said method being conducted in a double decomposition tank having an inner compartment and an outer compartment separated by an inner wall except for a bottom of the tank where fluid flows between the inner compartment and the outer compartment, said method comprising:
(a) supplying the oxidized liquid to the inner compartment of the double decomposition tank;
(b) supplying a slurry of basic calcium compound to the inner compartment of the double decomposition tank;
(c) conducting a double decomposition reaction in the inner compartment, wherein fine crystals of magnesium hydroxide and crystals of gypsum are formed;
(d) circulating a slurry present in the tank in a direction from the inner compartment to the outer compartment through the bottom of the tank;
(e) discharging a slurry overflowing from the tank, said slurry containing magnesium hydroxide; and
(f) feeding back a portion of the discharged slurry from the bottom of the tank to the outer compartment at the top of the tank, said slurry containing crystals of gypsum.

5. The method according to claim 4, wherein the slurry in step (d) is circulated at a flow rate effective to prevent precipitation of fine crystals of magnesium hydroxide.

6. The method according to claim 4, further comprising (g) discharging a slurry containing magnesium hydroxide from a top portion of the tank below the overflowing location of step (e); and (h) storing said slurry in a basic calcium slurry tank from which the basic calcium compound is drawn in step (b).

* * * * *